(12) United States Patent
Adams et al.

(10) Patent No.: US 6,289,812 B1
(45) Date of Patent: *Sep. 18, 2001

(54) PRINTING PROCESS FOR APPLYING A COMPOSITION USING A STENCIL OR DIGITAL DUPLICATOR

(75) Inventors: John Christopher Adams, Clackmannanshire; John Hamilton, Dunblane, both of (GB)

(73) Assignee: G. R. Advanced Materials Ltd., Stirling (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,386

(22) PCT Filed: Jan. 23, 1997

(86) PCT No.: PCT/GB97/00212

§ 371 Date: Oct. 2, 1998

§ 102(e) Date: Oct. 2, 1998

(87) PCT Pub. No.: WO97/27255

PCT Pub. Date: Jul. 31, 1997

(30) Foreign Application Priority Data

Jan. 23, 1996 (GB) ................................................. 9601280

(51) Int. Cl.[7] ............................ B41L 13/18; C09D 11/02

(52) U.S. Cl. .................... 101/491; 101/119; 101/129; 106/31.13; 523/160

(58) Field of Search .................................. 101/491, 116, 101/117, 118, 129, 119; 347/95, 100; 106/31.6, 31.27, 31.13; 523/160, 161

(56) References Cited

U.S. PATENT DOCUMENTS

| | | | | |
|---|---|---|---|---|
| 3,024,213 | * | 3/1962 | Ludlow | 260/23 |
| 3,760,724 | * | 9/1973 | Budzinski et al. | 101/426 |
| 3,841,827 | * | 10/1974 | Thettu | 432/60 |
| 4,162,997 | * | 7/1979 | Walsh | 260/27 R |
| 4,469,826 | * | 9/1984 | Carlick et al. | 523/339 |
| 5,330,565 | * | 7/1994 | Saitoh et al. | 106/20 R |
| 5,713,277 | * | 2/1998 | Szarka et al. | 101/123 |
| 5,990,230 | * | 11/1999 | Muramatsu et al. | 106/31.01 |

FOREIGN PATENT DOCUMENTS 0 778 323 A2   6/1997   (EP) .
1452556   10/1976   (GB) .

* cited by examiner

Primary Examiner—John S. Hilten
Assistant Examiner—Leslie J. Grohusky
(74) Attorney, Agent, or Firm—Sughrue, Mion, Zinn, Macpeak & Seas, PLLC

(57) ABSTRACT

A printing process including applying a composition to a substrate using a digital or stencil duplicator, the composition including a dispersion of particles of a thermoplastic or thermosetting polymer dispersed in an involatile organic liquid, where the size of the particles in the composition is less than 35 μm.

16 Claims, 1 Drawing Sheet

PRINTING PROCESS FOR APPLYING A COMPOSITION USING A STENCIL OR DIGITAL DUPLICATOR

FIELD OF THE INVENTION

The present invention relates to a novel printing process utilising a digital or a stencil duplicator, novel duplicating apparatus, and novel inks for use therein.

BACKGROUND OF THE INVENTION

Traditionally, the inks used on digital and stencil duplicators are of the water-in-oil emulsion type. The continued use of such inks in the duplicating field derives from their possessing a number of important properties.

In particular, water-in-oil emulsion inks can be formulated to have rheological characteristics suitable for use in rotary printing machines, making it possible to control the amount of ink used in the printing process and the degree of ink penetration into the printing substrate, and to prevent "tail flooding", the effect whereby ink exudes from under the trailing edge of the stencil master on a single drum duplicator. Also, and of crucial importance, emulsion inks can be formulated to be non film-forming, which allows their retention within the printing drum of a duplicator during periods between use without film formation, skinning, or crystallisation, which would result in irreversible blocking of the mesh screen on the drum.

However, there are major disadvantages associated with the use of emulsion inks which limit the ability of current duplicating processes to compete with other imaging technologies. In particular, the degree of image-fixing that can be achieved in modern duplicating processes, which are relatively high speed printing processes typically printing up to 150 pages per minute, using an emulsion ink is limited. It can be appreciated that since emulsion inks do not solidify after printing, their continued liquid state on the printed sheet leads to the problems of set off and smudging. These problems become more serious when the substrate being printed is non-absorbent, rendering emulsion inks generally unsuitable for the printing of non-absorbent substrates.

Another problem with the use of emulsion inks in duplicating processes is that they achieve lower image density than other digital imaging processes, such as laser printing. This inferior image density is believed to result from the fact that in order to achieve image-fixing of an emulsion ink a certain proportion of that ink must be absorbed into the print medium, thereby detracting from image density.

Yet another problem with the use of emulsion inks in duplicating processes is that if left in the drum of a duplicator between periods of use the water content of the ink tends to be reduced by evaporation. As a consequence, print quality on start-up is less than optimum until the drum is purged by fresh ink from the supply container, or cartridge. Typically, therefore, prints on start-up are characterised by excessive ink usage accompanied by abnormally high levels of set off and smudging.

Yet another problem relating to the use of emulsion inks is the phenomenon of paper cockling which results from the absorption of water from the Ink into the fibres of the printed paper. This is particularly evident when a large quantity of ink is used, either to print a large surface area or to achieve a high print density. Paper cockle is not only unaesthetic, but also the high points of the distorted paper surface exacerbate set-off.

Since the introduction of the digital duplicating process, attempts have been made to address the above-identified shortcomings. However, most or all of the proposed improvements have retained the use of an emulsion ink. For instance, JP-A-06128516 discloses the use of a water-in-oil emulsion ink containing a hot-melt component, so that image-fixing can be enhanced after printing by the application of heat. However, the other disadvantages associated with emulsion inks described above still remain unresolved.

Further, the necessity to remove water during the drying/fixing stage of the process disclosed in JP-A-06128516 may impose limitations on the process, for instance in terms of print speed. In an Example given in that document prints are fixed by passing over a heated roll at a speed of 3 m/min, which is a significantly lower printing speed than the 18–50 m/min range typical of modern digital duplicators.

SUMMARY OF THE INVENTION

According to a first aspect of the present invention, a printing process comprises applying a composition to a substrate using a digital or a stencil duplicator, the composition comprising a dispersion of particles of a thermoplastic or thermosetting polymer dispersed in an involatile organic liquid, wherein the size of the particles in the composition is less than 35 $\mu$m. Preferably, the printing process also includes a heat-fixing stage, to fix the composition to the substrate.

The printing process of the present invention possesses a number of significant advantages over conventional digital or stencil duplicating processes. In particular, it achieves a high print density comparable to that achieved in other digital printing methods. In addition, it achieves good image-fixing, particularly if a heat-fixing stage is included, and reduces considerably, if not eliminating altogether, set off and smudging. The process is therefore, readily applicable to non-absorbent media. Further, as the ink used in the process is not a water-in-oil emulsion ink, no water loss is experienced on standing of the printing machine, thereby overcoming the usual problems on starting-up the process after a period of non-use, and achieving greater process consistency. Additionally, the absence of water means that paper cockle is not a problem encountered when printing with this ink.

According to a second aspect of the present invention, an ink suitable for use on a digital or stencil duplicator comprises particles of a thermoplastic or thermosetting polymer dispersed in an involatile organic liquid, wherein the polymer particles have a diameter of less than 35 $\mu$m, and a colouring agent either dispersed in the liquid or incorporated into the polymer particles.

DESCRIPTION OF THE INVENTION

The compositions, or inks, for use in the process of the present invention are liquid at room temperature, i.e. 20–25° C., with the dispersed polymeric particles being insoluble and solid in the liquid component of the composition. However, at higher temperatures the dispersed particles are capable of dissolving in or absorbing the liquid. On cooling, however, the composition fuses, or solidifies, to form a cohesive film that is substantially free of liquid character, although this does not preclude the presence of some free liquid on or around the film. The temperature to which the composition needs to be heated in order to render it fusible depends upon its components. Typically, however, temperatures of at least 60° C., and more typically at least 100° C., will be required, although the temperature used should not be so high as to damage any of the components of the composition, substrate or printing machine. While it is not essential that a heating stage be employed in the process of the present invention this is preferred, as improved fixing of the composition to the substrate to which it has been applied can be achieved in this manner.

The maximum particle size of the polymer, or resin, particles dispersed in the compositions, or inks, for use in the process of the present invention is critical in order to avoid blocking of the screen or stencil on the digital or stencil duplicator. It is essential that the particles have a size, or diameter, of less than 35μm. Preferably, however the particles have a diameter of less than 20μm, and more preferably less than 10μm, eg. less than 8μm or even less than 5μm. It may, in some instances, be desirable to use particle sizes of greater than 1μm, if for instance the polymer is relatively difficult to process to smaller particle size. In the context of the present Application particle sizes are measured by the Hegmann guage method carried out on the final composition so as to take into account any swelling of the particles in that composition.

As with all printing processes, it is essential that the composition has rheological properties suitable for use on the printing machine for which it is intended, i.e. a digital or stencil duplicator. Such rheological properties can be determined by simply varying the proportions of the different components of the composition, and optionally the particle size distribution of the dispersed polymer, until satisfactory performance is achieved on the printing machine.

The liquid used to disperse the polymeric particles can be any suitable involatile organic liquid, including organosilicon and organophosphate liquids.

One type of composition that is suitable for use in the process of the present invention can be described as a plastisol. Plastisols and plastisol inks are well known and described in works of reference. Plastisol inks are traditionally used in screen printing, typically for textile printing applications. They comprise polymer, or resin, particles dispersed in a liquid termed a plasticiser, which is most commonly an ester of a dicarboxylic acid or phosphoric acid, although other plasticisers are known. When heated, the polymer particles swell or dissolve in the plasticiser, with the result that on cooling a substantially homogeneous, non-tacky, immobile polymer gel is achieved, which tends to be solid rather than liquid in form.

Any polymer, or resin, capable of yielding a plastisol can be used in the present invention. Examples include vinyl polymers, for instance polymers and copolymers of vinyl chloride, and acrylic polymers, for instance polymers and copolymers of acrylic acid and acrylic acid esters, eg. styrene-acrylate copolymers.

Any involatile liquid capable of yielding a plastisol, or paste, with a particular resin can be used as the plasticiser. For instance, for poly(vinyl chloride) (PVC), suitable plasticisers include phthalate, adipate and citrate esters, and compounds referenced in "PVC Technology", Third Edition, (1971) 115 –159.

One specific example of a plastisol that may be used is a poly(vinyl chloride) plastisol comprising an involatile liquid plasticiser (di-octyl phthalate) with PVC resin particles dispersed therein, and optionally a colouring agent.

There is no need to include in the plastisol a "tackifying agent", or rheology modifier, eg. polystyrene, to prevent flying or stringing of the plastisol, contrary to what is described in U.S. Pat. No. 3024213 and U.S. Pat. No. 3760724, as these are not problems in the process of the present invention. However, a tackifying agent can be used if this is desired, but preferably its amount is kept below 5% by weight based upon the amount of the thermoplastic or thermosetting polymer.

Other compositions that are useful in the present invention are those which may not traditionally be embraced by the term "plastisol", evidenced by the absence of any significant increase in viscosity when such compositions are heated to dissolve the polymer fully i.e. showing an absence of gel formation. Such compositions are thought to fall into two general classes. The first class of compositions includes those in which the polymer appears to dissolve in the liquid at elevated temperature, but without a substantial increase in viscosity. Examples of compositions of this type comprise particles of a polyolefin, eg. polyethylene, polypropylene, etc. dispersed in certain of the plasticisers mentioned above.

The second class of compositions includes those in which the polymer does not appear to dissolve in the liquid at elevated temperature, but instead is swellable in the liquid, i.e. it absorbs the liquid. An example of a composition of this type comprises PTFE dispersed in a polyglycol, such as polyethylene glycol.

The compositions for use in the present invention may or may not include a colouring agent. If they do not include a colouring agent typically they will be used as varnishes or lacquers for coating over pre-printed portions of a substrate. In this case, the varnish composition will also be applied via a drum on a digital or stencil duplicator. In the event the composition is to be used as an ink, a wide range of colouring agents can be used, including inorganic, organic, fluorescent and metallic pigments, and dyes. The colouring agent may be dispersed separately in the liquid or it can be incorporated within the resin particles. For instance, the pigmented resin particles can be toner particles as used, for example, in xerographic printing.

The relative proportions of polymer, liquid and colouring agent, if the latter is present, can be varied according to the print requirements and/or the rheological requirements of the duplicator on which the composition is to be used. For instance, the amount of polymer is typically in the range of 15–80 wt.%, preferably 20–60 wt.%, of the total composition. The amount of liquid included is typically 20–85wt. %, preferably 40–80 wt. %, of the total composition. The amount of colouring agent, if present, is typically up to 20 wt.%, of the total composition.

Additional components may also be incorporated, as in prior art ink formulations. Examples include extenders, dispersing agents, stabilisers, biocides, wetting agents and, in particular, agents to prevent the ink being removed from a printed sheet by a contact heat source such as a fusing roller, and to prevent the ink from becoming attached to a contact heat source. Such agents include silicone oils and fluorinated oils. It is essential that the particle size of any additional components be below 35 μm, again to avoid screen blocking on the duplicator machine. The amounts of any additional components used is conventional depending on their function.

The composition can be made simply by dispersing the polymer particles, and optionally colouring agent, in the involatile organic liquid. In order to achieve polymer particles of the requisite size, it is sometimes necessary to undertake a dry or wet milling process to modify commercially available polymers. Jet milling is an effective dry milling process for thermally-sensitive polymers. Subsequently, compositions can be prepared from the dry milled polymer by dispersing the powder and, optionally, colouring agent by conventional techniques into the involatile liquid component.

When a wet milling process is employed, it is necessary to ensure that temperatures are controlled to prevent heat fusing of the polymer. Triple roll mills, horizontal bead mills and ball mills are examples of suitable equipment for wet milling. When a ball mill is employed, it may be advantageous to carry out the process in a volatile non-solvent eg. for PVC, isopropyl alcohol. After milling the involatile liquid component of the composition is added and the volatile non-solvent is then removed by evaporation under reduce pressure. If a colouring agent is desired, this may be added before or after the ball milling process. When a triple roll mill is used the optional colouring agent and some or all of the liquid component of the composition can be milled together with the polymer by processes conventionally used for plastisol inks, eg. as described in U.S. Pat. No. 3024213.

As mentioned above, the printing process of the invention preferably incorporates a heat-fixing stage either as an off-line process or, preferably, integrated with the printing process on the digital or stencil duplicator itself, allowing set off free printing at higher printing speeds, typically at least 9 m/min (30 Å4 copies/min.), for instance at least 18 m/min (60 Å4 copies/min.). In this case, the heat-fixing stage will be positioned between the print drum and means for collecting the printed substrates.

The heat-fixing stage can comprise heating means which contact the printed substrate, such as a fuser roller or drum, or heat radiation means which do not contact the substrate, for instance an infra-red heating device or hot air jet. If a fuser roller is used it can be arranged to come into contact with printed substrates supported on a conveyor belt, although this may be less preferred in high speed processes. Alternatively, and preferably, the fuser roller may be used with another roller, which is optionally heated, positioned opposite the first roller, both rollers being arranged to apply pressure to either side of a printed substrate passing between them. Such an arrangement is commonly employed in xerographic copiers.

Preferably, the roller, or at least one of the rollers if there are two rollers, is compressible, to ensure effective contact of the substrate with the roller surface. Also, preferably at least the roller that is to contact the printed side of the substrate has a release polymer coating, comprising for instance a silicone-containing polymer or a fluoropolymer.

Alternatively, or additionally, means may be provided for applying a thin layer of a release, or lubricating, liquid on the surface of the roller that is to contact the printed substrate, so as to prevent print sticking to the roller. This release liquid can comprise a silicone oil, as is conventional in xerographic copiers, or any other suitable release liquid, for instance a fluoropolymer or polyglycol, eg. low molecular weight polyethylene glycol.

It has been discovered that variation of the release fluid permits optimum performance for a wider range of compositions, or inks, than is achievable if only a silicone release fluid is used. In this context, optimum performance means avoidance of ink picking off the paper onto the fuser roller. It is believed that best results are achieved when the ink is insoluble in the release fluid at the drum operating temperature. The option to use a variety of release fluids represents yet another advantage of this invention over prior art duplicating processes.

BRIEF DESCRIPTION OF THE DRAWING

Reference is now made to FIG. 1 which is a diagrammatic view of the inside a digital or stencil duplicator modified to incorporate a heat-fixing process.

DETAILED DESCRIPTION OF THE DRAWING

Figure 1:
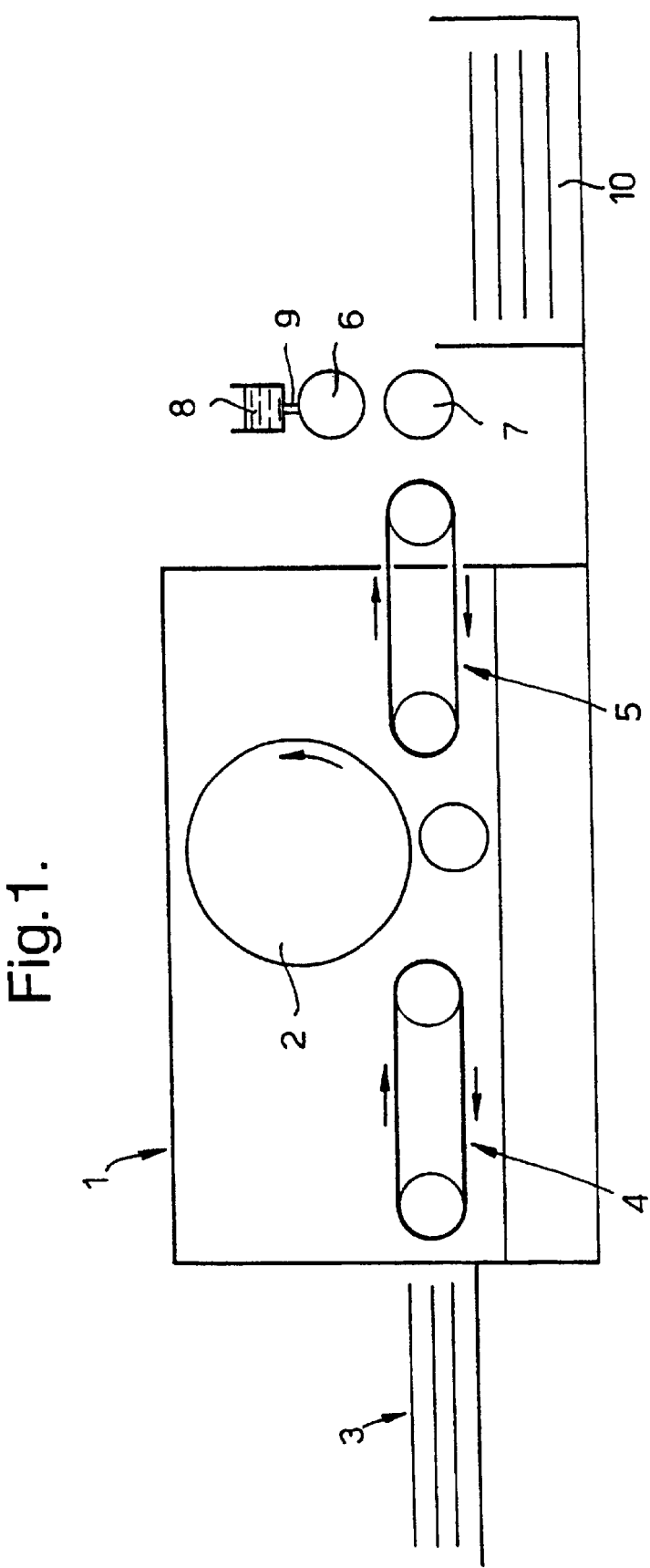

In FIG. 1, a duplicator 1 comprises a print drum 2 which is supplied with paper to be printed from paper feed tray 3 via paper feed belt 4. After printing, paper delivery belt 5 feeds the printed paper through rollers 6 and 7 which are arranged to rotate in opposite directions. Roller 6 is a heated roller (heating means not shown), and is typically provided with a release coating, eg. Teflon. In addition, lubricating fluid is provided on the surface of roller 6 from reservoir a via wick 9. Roller 7 is not heated, and is typically formed of compressible rubber. On passing through rollers 6 and 7 the print applied to the paper by drum 2 is heat-fixed, and the paper is then collected in collection tray 10.

The present invention is now further illustrated by way of the following Examples.

EXAMPLES 1–8

Inks 1–6 and 8, having the formulations shown in Table 1 below, were made by dispersing a pigment and a polymer individually in a involatile organic liquid by mixing using a high speed stirrer until an even dispersion was obtained, avoiding a temperature rise above ambient (20–25° C.). Ink 7 was made in a similar manner except that toner particles were dispersed in the liquid.

In Table 1 the abbreviations used have the following meanings:

| Polymer Types | |
| --- | --- |
| PVC = | Poly(vinyl chloride), jet milled. |
| Acrylic = | Poly(methylmethacrylate), jet milled. |
| PE = | Polyethylene. |
| PTFE = | Poly(tetrafluoroethene). |
| Toner = | Dry electrostatic powder, Nashuatec CT2 BLK for use on Nashuated 7125 Copier, jet milled. |
| Liquid Types | |
| DOP = | Di-octyl phthalate. |
| TBC = | Tributyl citrate. |
| PEG 400 = | Poly(ethylene glycol), average molecular weight 400. |

TABLE 1

|  |  |  | INK EXAMPLE NOS. | | | |
|---|---|---|---|---|---|---|
|  |  |  | 1 | 2 | 3 | 4 |
| RAW MATERIALS | POLYMER | TYPE | PVC | PVC | PVC | PVC |
|  |  | GRADE | EVIPOL ® | EVIPOL ® | EVIPOL ® | EVIPOL ® |
|  |  | MAX. PARTICLE SIZE μm | 4 | 4 | 4 | 4 |
|  |  | SOFTENING POINT ° C. | 70–80 | 70–80 | 70–80 | 70–80 |
|  |  | MELTING POINT ° C. | 160–200 | 160–200 | 160–200 | — |
|  | LIQUID | TYPE | DOP | DOP | TBC | TBC |
|  | PIGMENT | TYPE | CARBON BLACK | CARBON BLACK | CARBON BLACK | PHTHALO-CYANINE BLUE |
| INK FORMULATION | POLYMER % | | 51 | 44.6 | 44.6 | 51.2 |
|  | LIQUID % | | 46 | 50.9 | 50.7 | 42.5 |
|  | PIGMENT % | | 3 | 4.5 | 4.7 | 6.3 |
| INK PROPERTIES | HEGMANN μm | | 6 | 6 | 4 | 4 |
|  | VISCOSITY (Pa · s) 20° C. | | — | 16.9 | 13.0 | — |
|  | VISCOSITY (Pa · s) 90° C. | | — | 3870 | 3,730,000 | — |
|  | HEAT FIXING 100° C. | | COHESIVE FILM | — | — | — |
|  | HEAT FIXING 150° C. | | — | COHESIVE FILM | COHESIVE FILM | COHESIVE FILM |

|  |  |  | INK EXAMPLE NOS. | | | |
|---|---|---|---|---|---|---|
|  |  |  | 5 | 6 | 7 | 8 |
| RAW MATERIALS | POLYMER | TYPE | ACRYLIC | PTFE | TONER | PE |
|  |  | GRADE | PLEXIGUM ® M914 | FLUO HTG | CT2 BLK | MPP 620 XF |
|  |  | MAX. PARTICLE SIZE μm | 5 | 9# | 6 | 8# |
|  |  | SOFTENING POINT ° C. | 130 | — | 85 | — |
|  |  | MELTING POINT ° C. | — | <316 | — | 114–116 |
|  | LIQUID | TYPE | DOP | PEG 400 | GLYCEROL | TBC |
|  | PIGMENT | TYPE | CARBON BLACK | CARBON BLACK | CARBON BLACK | CARBON BLACK |
| INK FORMULATION | POLYMER % | | 25.3 | 25 | 20 | 27.8 |
|  | LIQUID % | | 69.3 | 70.8 | 80 | 67.6 |
|  | PIGMENT % | | 5.3 | 4.2 | — | 4.6 |
| INK PROPERTIES | HEGMANN μm | | 5 | 6 | 6 | 8 |
|  | VISCOSITY (Pa · s) 20° C. | | 1.8 | 156* | 23.3 | 0.38 |
|  | VISCOSITY (Pa · s) 90° C. | | GELLED | 179* | GEL | 0.53 |
|  | HEAT FIXING 100° C. | | — | — | — | — |
|  | HEAT FIXING 150° C. | | COHESIVE FILM + FREE LIQUID | COHESIVE FILM | COHESIVE FILM + FREE LIQUID | COHESIVE FILM |

Manufacture's data.
*Viscosity at 30° C.
+Viscosity at 150° C.

The maximum particle size of polymer powder was measured by Coulter Instruments Multisizer II for all jet milled polymers.

In general viscosities were measured on a Bohlin CS Rheometer at 200 Pa (except for the viscosity of Ink 6 which was measured on a Brookfield DV-1 Viscometer) 5 mins. after the sample had equilibrated to the designated temperature. The viscosity of ink 5 at 90° C. was not measured at 5 mins., but gelling was observed after 30 mins.

Heat-fixing was tested as follows. A sample of test ink, approximately 5 ml, was drawn down on a thick sheet of polyester film using a wire-wound bar, wire diameter 0.08 mm. The sheet of film was then placed in an oven heated to the designated temperature for one minute. After cooling to room temperature the ink was assessed for cohesiveness by rubbing with a finger.

As is apparent from Table 1, on the application of heat all the inks set to form a cohesive film, in some cases with the presence of free liquid.

A number of print tests were then run on the inks at a temperature of 20° C.±2° C., at 50% RH ±10% RH (Relative Humidity), using standard 80 g/m2 office bond paper on a Gestetner ® model 5325 CopyPrinter, optionally modified as shown in FIG. 1 to incorporate fusing rollers from a Gestetner ® 2553/Ricoh ® FT 6750 xerographic printer (speed 50 copies per min.). The roller fluids used were of two types: a silicone fluid that is the standard fluid for the Gestetner ® 2553/Ricoh ® FT 6750 Copier, and a fluorocarbon fluid that is a blend of Fomblin HVAC 140/13 (42%) and Fomblin LVAC 06/6 (58%). Two standard emulsion inks, Gestetner ® CPT1 and Gestetner ® CPI2, were also tested, and image quality compared against that obtained with the process of the present invention.

The results are set out in Table 2, below.

TABLE 2

| | | TEST NO. | | | | | | | |
|---|---|---|---|---|---|---|---|---|---|
| | | 1 | 2 | 3 | 4 | 5 | 6 | 7 | 8 |
| | | | | | INK NO. | | | | |
| | | CPT1 | CPT1 | 2 | 2 | 3 | 3 | 3 | CP12 |
| PRINT CONDITIONS | PRINT SPEED A4 COPIES/MIN | 60 | 60 | 60 | 60 | 60 | 60 | 60 | 60 |
| | FUSER ROLLERS | OFF | ON | ON | ON | OFF | ON | ON | OFF |
| | FUSER ROLLER FLUID | — | SILICONE | SILICONE | FLUORO-CARBON | — | SILICONE | FLUORO-CARBON | — |
| TEST RESULTS | PRINT DENSITY | 1.07 | 1.05 | 1.25 | 1.38 | 1.31 | 1.42 | 1.20 | 1.06 |
| | SET OFF | 1.5 | 0.5 | 0 | 0 | 1.5 | 0 | 0 | 1.0 |
| | DUPLEX MARKING | 2.5 | — | — | 0 | — | 0 | 0 | 3.0 |
| | FINGER RUB TEST | FAIL | FAIL | — | PASS | FAIL | PASS | PASS | FAIL |
| | MASTER BLOCKING | NO | NO | NO | NO | — | NO | NO | NO |
| | TAIL FLOODING | NO | NO | — | NO | — | NO | NO | NO |
| | INK PICK OFF ON ROLLER | — | YES | YES | NO | — | NO | NO | — |

| | | TEST NO. | | | | | |
|---|---|---|---|---|---|---|---|
| | | 9 | 10 | 11 | 12 | 13 | 14 |
| | | | | INK NO. | | | |
| | | 4 | 5 | 5 | 6 | 7 | 8 |
| PRINT CONDITIONS | PRINT SPEED COPIES/MIN | 60 | 60 | 60 | 60 | 60 | 60 |
| | FUSER ROLLERS | ON | ON | ON | ON | ON | ON |
| | FUSER ROLLER FLUID | SILICONE | SILICONE | FLUORO-CARBON | SILICONE | SILICONE | SILICONE |
| TEST RESULTS | PRINT DENSITY | 1.30 | 1.13 | 1.24 | 1.29 | 1.00 | 1.20 |
| | SET OFF | 0 | — | 0 | 0 | 0 | 0 |
| | DUPLEX MARKING | 0 | — | 0 | NOT TESTED | — | NOT TESTED |
| | FINGER RUB TEST | PASS | — | PASS | PASS | — | PASS |
| | MASTER BLOCKING | NO | NO | NO | NO | NO | YES |
| | TAIL FLOODING | NOT TESTED | NO | NO | YES | — | NOT TESTED |
| | INK PICK OFF ON ROLLER | NO | YES | NO | NO[1] | NO[1] | NO[1] |

[1] No ink apparent on roller, but ink transfer back to substrate evident.

Set of was assessed by comparison with retained standards on a scale 0–5, where 0=zero set off and 5=worst set off.

Duplex Marking is a measure of marks induced on the first side of a paper substrate when printing the second side of that substrate, and is assessed by a comparison with retained standards on a scale 0–5, where 0=no marking and 5=worst marking.

The Finger Rub Test is an assessment of the ability to smudge the printed image by rubbing with a finger. A "Pass" rating is given where there is an absence of ink smudging. All other results are rated as "Fail".

The Tail Flooding Test is an assessment of the tendency for the ink to exude from under the trailing-edge of the stencil master while printing. Absence of this effect after making 4000 prints is confirmed by a "No" rating.

Print Density was measured using a Macbeth RD 914 Reflectance Densitometer.

With regard to the fuser rollers, "On" indicates fuser rollers fitted and operating, "Off" indicates fuser rollers not fitted.

Test 1 is a comparative test using a conventional emulsion ink. Test 2 shows that use of heated rollers with the same ink does not eliminate set off, finger smudging or poor finger rub performance. There is no effect on print density either.

Test 3 shows that the use of a plastisol ink according to the invention achieves high print density, zero set off but some ink picking problems. By comparison, Test 4 uses same ink as test 3 but resolves printing problems by changing from silicone to fluorocarbon roller fluid.

Test 5 illustrates the performance of a plastisol ink according to the invention with no heat-fixing stage. Set off and finger rub problems were experienced. By comparison, Test 6 demonstrates satisfactory results by comparison with Test 5, as a result of heat-fixing.

Test 7 demonstrates that a fluorocarbon roller fluid may be used with Ink 3, as an alternative to a silicone roller fluid.

Test 8 is a comparative test using a standard blue emulsion ink.

Test 9 demonstrates that satisfactory results were obtained for a blue plastisol ink according to the invention.

Tests 10 and 11 illustrate the performance of an alternative plastisol system, which is acrylic based. The change from a silicone roller fluid in Test 10 to a fluorbcarbon roller fluid in Test 11 resolves the roller pick off problem.

Test 12 demonstrates that while Ink 6 is fixed adequately by the fuser rollers, some ink pick off is observed. This ink favours use of non-contact heat-fixing.

Test 13 demonstrates the use of a toner in an ink according to the invention. This ink also favours the use of non-contact heat-fixing.

Test 14 demonstrates that master-blocking is observed with a particle size of 8 $\mu$m for this particular ink formulation, and that smaller particle size may be preferred. This ink also favours use of a non-contact fuser.

Where non-optimum results were observed with any of the inks according to the invention, these can be improved upon, or corrected for, by routine modification of the ink formulation, or process conditions.

EXAMPLE 9

This example demonstrates the importance of particle size of the polymer component in the present invention.

A poly(vinyl chloride) polymer recommended for use in plastisol formulations (Evipol ® EP 6762, European Vinyls Corporation (UK) Limited) was jet milled to produce a powder which had a particle size which was mostly below 4 $\mu$m, as determined by Coulter Instruments Multisizer II, as shown below.

|  | Before Jet Milling | After Jet Millling |
|---|---|---|
| PVC Maximum Size | 30 $\mu$m | — |
| <10 $\mu$m | 78% | 100% |
| <5 $\mu$m | 54% | 99.7% |
| <4 $\mu$m | 47% | 98.5% |

The milled PVC was used to make the ink formulation below:

| Carbon Black | 3 Parts |
|---|---|
| Di-octyl Phthalate | 46 Parts |
| Jet Milled PVC | 51 Parts |

The carbon black was dispersed in di-octyl phthalate (15 parts) using a high speed dispersing mixer. The remainder of the di-octyl phthalate was added to the resultant dispersion which was then stirred slowly with a propeller stirrer and the jet milled PVC was gradually added. Stirring was continued until an even dispersion of the PVC was achieved giving a Hegmann value of 6 $\mu$m.

The ink was printed on a Gestetner 5325 CopyPrinter. After 4000 prints no deterioration in print quality was observed. Additionally there was no seepage from under the trailing edge of the stencil ("tail flooding").

Prints were also made on a Riso RC 5800 digital duplicator using Texopaque Black Ink (OP 001), a commercial plastisol ink manufactured by Sericol Limited for screen printing of textiles. Initially high density prints were obtained but as printing continued there was a progressive deterioration of image quality. Subsequent investigation revealed that the screens on the printing drum had become blocked by resin particles, a result consistent with the Hegmann gauge measurement of 35–40 $\mu$m for this ink.

The print results are presented in Table 3, and compared with a standard water-in-oil emulsion ink, Gestetner ® CPT1 also printed on a Gestetner ® 5325 copyprinter.

TABLE 3

| INK | INVENTION | TEXOPAQUE BLACK INK (REFERENCE) | GESTETNER CPT1 (REFERENCE) |
|---|---|---|---|
| VISCOSITY [Pa · s (POISE)] | 1.39 (13.9) | 2.99 (29.9) | 1.46 (14.6) |
| HEGMANN VALUE ($\mu$m) | 6 | 35–40 | 5 |
| HEAT FIXING TEXT RESULT 100° C./10 s | COHESIVE FILM | COHESIVE FILM | OILY LIQUID |
| PRINT DENSITY (SPEED 3) | 0.93 | 1.20 | 0.97 |
| SET OFF | 1.0 | — | 0.5 |
| SCREEN BLOCKING | NO | YES | NO |
| TAIL FLOODING | NO | — | NO |

What is claimed is:

1. A printing process comprising applying a composition which is not an emulsion to a substrate using an apparatus selected from the group consisting of a digital duplicator and a stencil duplicator comprising a drum for containing ink and a stencil master mounted on said drum, wherein the composition comprises polymer particles dispersed in an involatile organic liquid, wherein the polymer is selected from the group consisting of a thermoplastic polymer and a thermosetting polymer, and wherein the size of the particles in the composition is less than 35 $\mu$m.

2. A process according to claim 1, wherein the composition is fixed onto the substrate by the application of heat.

3. A process according to claim 2, wherein heat-fixing is carried out on the digital or stencil duplicator.

4. A process according to claim 2 or claim 3, wherein heat-fixing is by contacting the composition on the substrate with a heated roller.

5. A process according to claim 4, wherein a release liquid is applied to the roller to effect release of the composition therefrom.

6. A process according to claim 2 or claim 3, wherein heat-fixing is by infra-red radiation of the composition on the substrate.

7. A process according to claim 2 or claim 3, wherein heat-fixing is by passing hot air onto the substrate.

8. A process according to claim 1, wherein the polymer is insoluble in the organic liquid at 20 to 25° C. and soluble or swellable in the liquid at a temperature of at least 60° C.

9. A process according to claim 1, wherein the composition further comprises a colouring agent either dispersed in the liquid or incorporated into the polymer particles.

10. A process according to claim 1, wherein the liquid is a plasticiser.

11. A process according to claim 1, wherein the polymer is a vinyl polymer.

12. A process according to claim 1, wherein the polymer is not a vinyl polymer.

13. A process according to claim 1, wherein the composition comprises a tackifying agent in an amount of less than 5% by weight based on the weight of polymer.

14. A process according to claim 9, wherein the coloring agent is incorporated into the polymer particles.

15. A process according to claim 9, wherein the amount of thermoplastic polymer or thermosetting polymer is 15–80 wt. %, the amount of liquid is 20–85wt. %, and the amount of coloring agent is up to 20 wt. %, based on the total composition.

16. A process according to claim 12, wherein the polymer is selected from the group consisting of an acrylic polymer and a polyolefin.

* * * * *